April 26, 1960 J. OPPENHEIMER 2,934,601
CLOSED CIRCUIT TELEVISION SYSTEM AND METHOD OF OPERATION
Filed July 18, 1955 3 Sheets-Sheet 1

INVENTOR.
JESS OPPENHEIMER
BY
J. Comstock
ATTORNEY

INVENTOR.
JESS OPPENHEIMER
BY
ATTORNEY

CLOSED CIRCUIT TELEVISION SYSTEM AND METHOD OF OPERATION

DEFLECTION REVERSING CIRCUIT

INVENTOR.
JESS OPPENHEIMER
BY
J. Comstock
ATTORNEY

United States Patent Office 2,934,601

Patented Apr. 26, 1960

2,934,601

CLOSED CIRCUIT TELEVISION SYSTEM AND METHOD OF OPERATION

Jess Oppenheimer, Los Angeles, Calif.

Application July 18, 1955, Serial No. 522,799

8 Claims. (Cl. 178—6.8)

This invention relates to a novel closed circuit television system in combination with a camera such as a television or movie camera. This system and its method of operation relate further to closed circuit television means for transmitting information to a person while he is being simultaneously viewed by a television or movie camera, such information being transmitted by such means and in such manner that it is projected directly in front of the viewing camera lens and into the line of sight of the subject, while permitting the person to be viewed by the camera lens.

In the production of a television program the speaker, actor or performer is viewed by one or more television cameras through which the performance is transmitted. In order to give the impression of spontaneity, the script or text of the material to be delivered must be committed to memory and it is obvious that hesitancy, fumbling, obvious reading of a manuscript, and the like will militate against the creation of the desired impression and impair the performance. In addition, programs must be carefully timed and any delays which occur through faulty memorization or reading of lines may necessitate abrupt interruption of the program when the program time has expired. By the same token, premature termination may be caused by accelerated reading of lines. Similar principles apply in filmed television programs and movie production, even though timing is not necessarily so critical as the production is not "live." Still, muffed lines, poor timing and similar results of faulty memory, etc. can have serious effects on the costs of production through the necessity for repeated shots until the desired degree of perfection is obtained.

The necessity for memorizing long scripts requires the expenditure of considerable time by performers and speakers as well as one or more rehearsals. The elimination or reduction of these requirements would be a distinct advantage in facilitating program and film production at lower cost, at the same time eliminating or minimizing the risks involved through loss of memory or "ad libbing" by the performer. News commentators, panelists, speakers, and the like, who frequently must appear before the camera "cold," or with little time to prepare, are particularly prone to errors, hesitancy, or forgotten lines. This is also true of announcers who must be letter perfect, particularly in reading commercials since if an error occurs it may be fatal to the effectiveness of the advertising.

In order to solve the problems referred to above, various expedients have been resorted to, among which is included placing the script on cards positioned in the vicinity of the camera so that the performer can read the material at one side or above or below the camera lens. In some cases this material has been placed on a movable strip of paper positioned adjacent the camera, with the movement being controlled by remote control. Disadvantages of such methods are obvious since no matter how closely adjacent the camera the material may be placed, the angle of viewing the material becomes obvious, and there is also the possibility that the eye movements of the performer can be detected by the audience.

The psychological value of prompting equipment has been recognized since even accomplished speakers and actors are given a feeling of confidence by the availability of script material, even if its use should not become necessary.

As described in applicant's copending applications Serial No. 346,987, filed April 6, 1953, entitled Prompting Apparatus, and Serial No. 462,328, filed October 14, 1954, entitled Prompting Apparatus and Method, of which this application is a continuation-in-part, optical means are described in which prompting information is observed by a person while looking directly toward or into a camera lens. The information referred to is projected onto a transparent mirror interposed before a camera lens together with means for continuously transmitting such information in combination with a monitoring system. Such optical systems require duplication of expensive optical equipment, moving parts such as film transport means associated with such cameras which tend to introduce noises into the transmission system, and the use of multiple cable systems interconnecting various units. In addition, multiple copies of script or other information to be transmitted are required and such material must preferably be reproduced upon transparent film in order to permit transmission of light therethrough.

In accordance with applicant's present invention it has been discovered that script material and/or other information may be observed by a video system and transmitted by closed circuit to a video receiving system with a picture tube being so mounted in association with a viewing camera lens that the picture is projected onto the reflecting surface of a transparent or semireflecting mirror interposed between the camera lens and the person being viewed and to whom the information is being transmitted. In order to reflect the material to the person in its direct readable form a reversal of the image which is projected upon the face of the picture tube is provided so that a reverse, but erect, image is projected onto the transparent mirror with the result that the image in its original or direct form is reflected to the person. In other words, in the present system image reversal is referred to in the sense of the term "mirror image" in which the image is reversed horizontally or from left to right through reflection from a mirror and in order to permit observation in correct or normal position, the image is projected on the mirror in reverse position.

In the television system described herein the script material is typed, printed or otherwise placed upon a strip or sheet of paper which may be in the form of a roll. The roll is then unwound and rewound onto a spool which is motor driven at a predetermined rate, the material being viewed by the lens of a video camera system as it is moved past the lens. The script material as observed by the camera is transmitted to the video receiver and projected onto the face of the picture tube as mentioned above. Separate cuing and signal means are introduced into the viewing area of the closed circuit television camera lens for simultaneous but independent transmission thereof to the person with provision also being made for the introduction of emergency messages into the viewing area.

A monitoring system is provided for use in the control room or elsewhere by the director which includes the means for mounting and moving the script material, a video transmitting system including a video camera for observing and transmitting the material, a video receiving system including a picture tube connected in closed circuit with the video transmitting system so that the same material being transmitted to the person is also transmitted to the monitor picture tube. The monitor system will also include the necessary controls for regulating the rate of movement of the script material past the camera lens as well as means for transmitting cues and ancillary information as desired.

Ancillary viewers are also provided not necessarily attached to cameras by utilizing as many additional video receivers as may be desired, in closed circuit with the video camera observing the script, which viewers are positioned at desired points so that the script or other material may be observed by the person when he turns aside from the camera which is observing him and when he is not looking into the camera. At the same time the script may be followed by other performers who are not looking directly into the camera lens.

The system described herein may be utilized in a conventional manner for continuous or intermittent transmission of prompting or other information to a performer before a television or movie camera but has a great degree of flexibility and can be applied in various ways to achieve desirable results which will be discussed generally as follows:

(*a*) For narration supplied by a performer to accompany a picture being transmitted over the air, the actual picture being transmitted can be superimposed on the face of the picture tube of the viewer together with the previously prepared narration to be used so that the narrator sees the narration and picture it relates to simultaneously and can thus stay in perfect synchronization.

For example, in a newscast, the newscaster is presenting the news to a camera and a picture of him is being sent out over the air. Let us say he starts to describe a big fire which took place that day. He says: "Here are some actual scenes from the disaster." At this point, the movies of the actual fire begin to be telecast. The newscaster has some comments to make while these pictures are being shown on the air. He must consult the script in his hand for the comments and at the same time watch a monitor which shows the pictures being telecast so that he can synchronize his remarks with the picture. When the pictures are over, the director cuts back to the camera, photographing the newscaster. Very often he is caught still looking at the monitor or in the act of turning back from the monitor to the camera. If anything happened to the film, such as breaking, the director's only alternative would be to cut back to the newscaster. The newscaster would have no way of knowing of this move until he saw his own picture on the monitor and quickly turned around to face the camera. In the present system, as the newscaster says: "Here are some pictures from the scene," and the director cuts to the pictures so that they are being sent out over the air, the signal that is going out over the air is fed back into the closed circuit. The narration is also being picked up by a small vidicon. So, what appears on the face of the viewer tube, is the picture that is going out over the air with the narration superimposed on it. The newscaster never takes his eyes from the camera and the director can cut back and forth between the pictures and the newscaster at will. It is advisable, when using this procedure, to reverse the polarity so that the letters appear white on a black surface. This is done by adding one stage of video-amplification either to the camera or the receiver. This allows the picture to be seen more clearly as most of the field would be left black.

As another example, if a man was describing his own pictures or describing a painting or some other object in an extemporaneous manner and one camera is taking a picture of the object and the other taking a picture of him, one could simply feed the signal from the camera which pictured the object into the closed circuit. It would then appear on the face of the viewer and the performer could describe it while looking directly into the camera instead of away from the camera at the object. Here again the director could cut from one camera to the other at will and always come up with a picture of the performer looking into the camera.

(*b*) As a corollary to (*a*), for supplying narration to go on a sound track to accompany a previously filmed movie, as in the case of a travelogue, the movie can be picked up on a separate video camera connected into the receiver circuit and projected onto the screen of the picture tube along with the text of the narration which is picked up by the video camera on the monitor, both being projected superimposed by the reflecting mirror, the narration by the narrator then being recorded on the sound track coinciding directly with the picture at the proper points.

(*c*) One of the drawbacks of the conventional prompting systems is that performers tend to use it as a crutch and never learn their lines as the prompters are there during rehearsal. Another disadvantage is that when the prompters have moving copy adjacent to the camera, it is very distracting to those performers who do memorize their scripts and these performers find that in such event they are forced, at least unconsciously, to read their lines since it is impossible to ignore the material. With the system described herein, the prompter can truly function as a prompter. By switching off the illumination of the moving copy at the monitor, or by switching off the illumination of the picture tube, the screen of the picture tube can be kept dark, with the copy moving at the predetermined rate or in pace with the actor until such time as the actor really requires prompting. In this case, the director at the control panel, or the performer himself by means of a concealed switch, can cause the script to appear on the reflecting mirror when and for as long as needed.

(*d*) Standard cues and instructions can be transmitted to the performer along with the moving copy by arranging these cues in the path of the camera lens and illuminating these by means of independent switches on the control panel. In addition, last minute or emergency information may be transmitted to the performer by writing on a card and introducing the card into the path of the camera lens in the focal plane of the moving copy. This would be especially valuable also in programs where no script is being used, or where news flashes must be introduced during a newscast.

(*e*) Another important television application of the system described is in projecting a picture of the scene in which the performer is engaged, onto the viewer of the camera which is taking the picture, simultaneously with transmission of the scene over the air, or in the case of a movie, simultaneously with the filming of the scene. In this way by looking directly into the camera, the performer sees what the camera sees which includes the entire area behind him. Thus, the performer could time his own actions to coordinate with what may be occurring behind him and what he could see on the viewer, and in this way ensure perfect timing of the scene. This principle is applicable also to the filming of movies, since in taking a closeup, for example, of someone who is reacting to, or holding a conversation with, another performer, previously shot and developed film could be fed to the prompter and the timing of the reactions would be coordinated perfectly.

Other features and applications of the present invention will be apparent from the following description particularly when taken in conjunction with the accompanying drawings, in which.

Figures 1, 2:
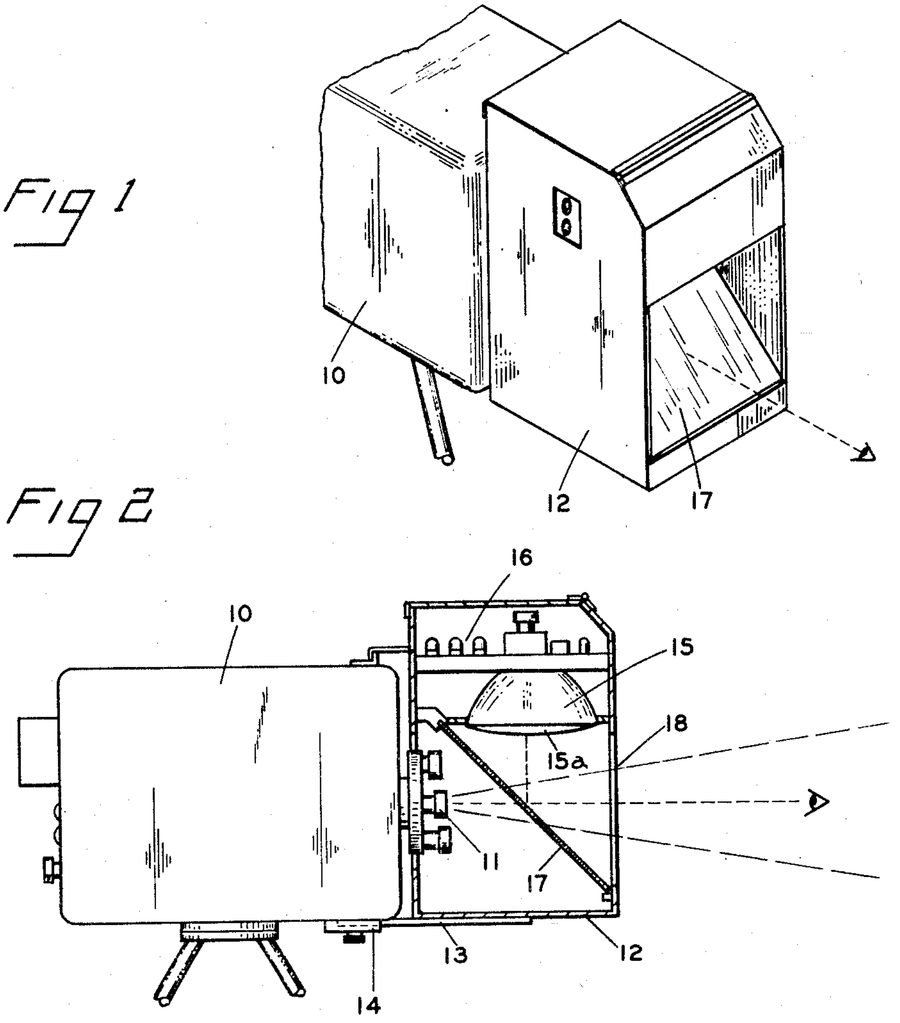
Figure 1 is a view in elevation of a viewer of the present invention mounted on a camera.
Figure 2 is a view partly in elevation and partly in vertical transverse cross section illustrating a viewer mounted on a camera showing the arrangement of parts.

Referring now to the drawings, in Figures 1 and 2, television or other camera 10 having lens system 11, has mounted thereon a viewer enclosure 12. The enclosure is mounted upon a supporting plate or bracket 13 which is adjustably and removably attached to the base of the camera at 14. Within the enclosure is positioned a television picture tube 15 with its screen or picture face **15*a* positioned horizontally. The tube is powered by a television receiving chassis 16 mounted within the enclosure as shown. Of course, the receiving chassis may be positioned elsewhere and the signal fed to the tube by cable. The picture which appears on the face of the tube is projected onto the face of an inclined transparent mirror 17 and reflected therefrom to the eyes of a performer through opening 18** in the enclosure as shown. The transparent mirror may be of thin glass or other transparent sheet material, either uncoated or coated with a thin film of transparent but reflective material so that the light transmissibility through the mirror is not seriously affected. Very thin metallic films can be deposited in microscopic thickness by vacuum metallization or other methods, and in general this mirror is desirably a thin pellicle which will eliminate or minimize double images. Thus, the lens of the camera can "see" the subject while the subject can see the material which appears on the face of the television tube at the same time as the camera "sees" him. In utilizing mirrors of this type, the script material is reflected to the viewer but the camera will not pick up an image of the script.

Figure 3:
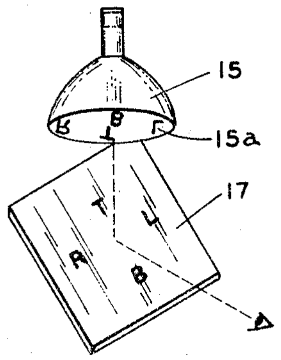
Figure 3 is a view showing the arrangement of a picture tube and mirror as used in the viewer, and illustrating the manner in which material on the screen of the tube is reflected by the mirror.

As shown in Figure 3, screen **15*a* of picture tube 15 reproduces the material which has been transmitted by the television camera lens. Since the mirror 17** will reflect a reversal image of this material, it is necessary to reverse the sweep in the television receiving circuit so that the image on the screen of the tube will be reversed and on reversal by the mirror will be projected to the eyes of the performer in normal position as shown.

Figure 4:
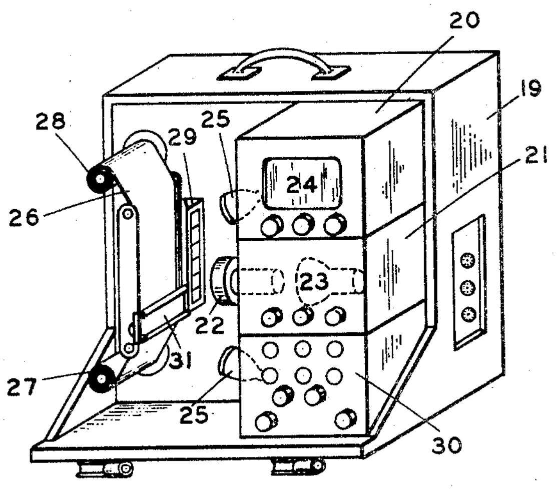
Figure 4 is a view in elevation of a monitor arrangement utilized in the viewing system of the invention.

In Figure 4 is shown a monitor unit utilized in the viewing system described herein. For portability, a case 19 is provided, shown with the cover removed. The case houses a receiving unit 20 and a television camera unit 21 housing a lens system 22 and a camera or "vidicon" tube 23. While the well-known "vidicon" camera tube is referred to by way of example, any type of television camera tube may be utilized. Script material applied to roll 26 is illuminated by lamps 25, is picked up by lens 22 and tube 23, and appears on receiving tube 24 of the monitor. The material on roll 27 is rewound on roll 28, the rolls being drawn by a variable speed drive (not shown) to permit movement of the script on the roll at any desired speed with the speed control on the monitor panel. Beside the script is positioned a cue panel member 29 which is divided into a number of windows each bearing a particular instruction serving as a cue and each illuminated by a separate miniature light bulb actuated by a separate switch on the monitor control panel 30. Thus, each of said instructions or signals may be actuated simultaneously with the movement of the script past the camera lens to provide auxiliary cues to the performer. In addition, an emergency or flash instruction panel is provided as shown at 31. This panel is so designed that a small card 32 bearing an emergency message or instruction can be brought to the performer's attention by sliding it manually into position in the frame of the panel. Thus, the director may write out a message on the card in longhand to tell the performer something on short notice during the performance and simultaneously with transmission of the normal script.

Figure 5:
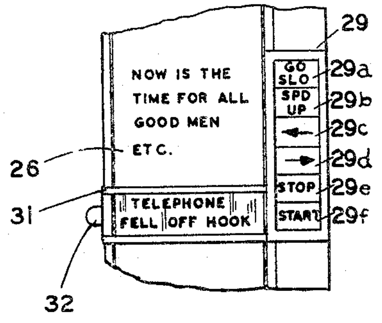
Figure 5 is an enlarged view of a portion of Figure 4, showing the area viewed by the camera tube.

Figure 5 illustrates the script and cue viewing area on an enlarged scale with typical cue instructions.

Figures 6, 7:
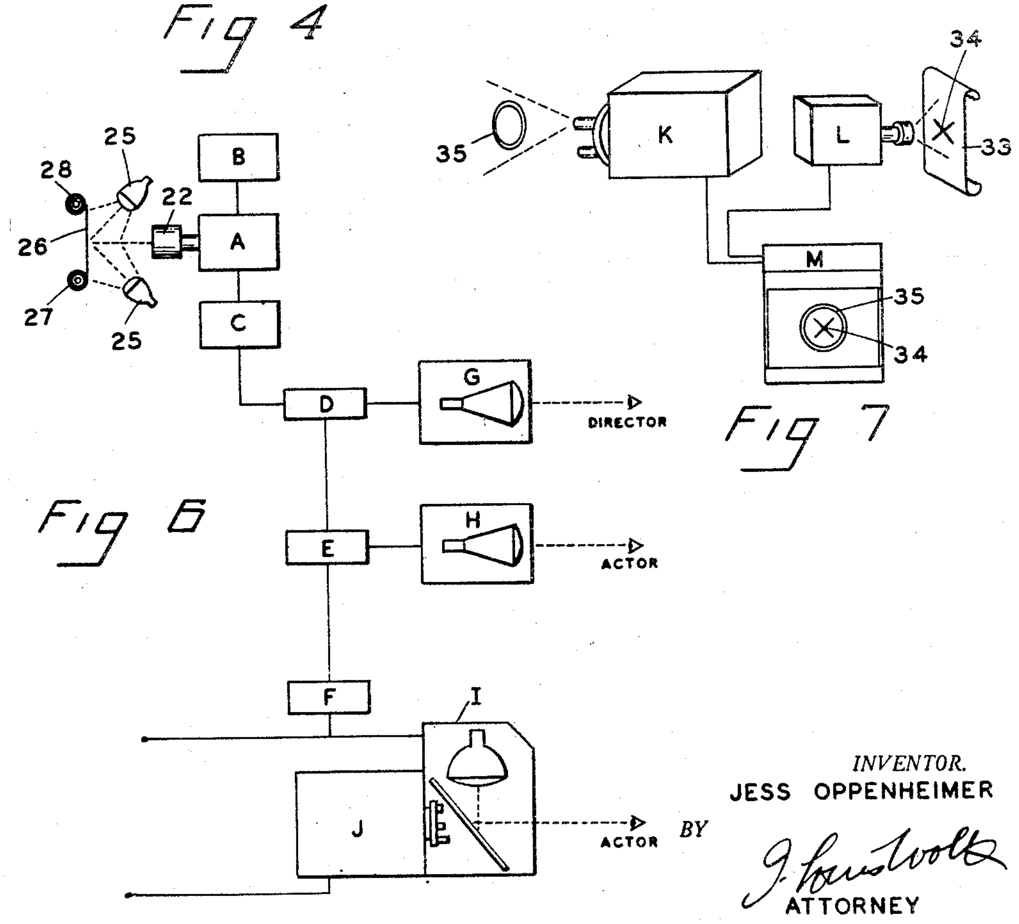
Figure 6 is a schematic diagram illustrating the arrangement and interconnection of units in a prompting system of the invention.
Figure 7 is a diagrammatic illustration of another arrangement used in the present invention.

Figure 6 is a diagrammatic illustration of a viewing system incorporating a monitor such as in Figure 4 and a viewer on a camera such as in Figure 2. A represents a vidicon or video camera tube and lens system, B is the vidicon camera power, synchronizing and sweep circuits, C represents the video camera's video circuits, D, E and F are isolation transformers, G is a video receiver incorporated in the monitor, H represents one or more auxiliary video receivers which receive the script and cue material directly and which are positioned at any desired points in the studio or on the set, if desired, and J represents a film or studio video camera to which is affixed the viewer I to permit the performer to read the script while looking directly into the camera lens while the camera is filming or televising the performance. The isolation transformers are required when utilizing the camera which uses a "vidicon" tube which operates on RF, in order to prevent interference between circuits. If a conventional studio type camera which transmits only video frequencies is used to pick up the script material, the transformers may be eliminated. The operation of this system is as follows: script material typed upon a rolled paper strip 26 is unwound from roll 28 upon roll 27 at a rate of speed controlled from the monitor panel. The script is illuminated by lamps 25 and picked up by lens system 22 and video tube A. The video signal transmitted by C appears upon the faces of the video picture tubes G and H in a normal and correct position. G is the picture tube for the monitor and is viewed by the director, while H is the auxiliary picture tube positioned so that the script can be read directly by the performer while looking away from the camera. The same video signal is also transmitted to viewer I and appears on the face of its picture tube being reflected to the performer by means of the inclined reflecting mirror as illustrated. At the same time, the performer is observed by the television or other camera J.

Figure 7 describes a modified application of the present invention in which two cameras are shown each observing or "shooting" a different scene or subject. One instance of such an application is in the case where the camera observes the performer in the scene in which he is performing while at the same time the television script camera is transmitting the script to the performer. In this case, the viewer M may be mounted on camera K, the scene being represented by ring 35. The script is picked up by video camera L and is represented by X34 on strip 33. As shown, the performer sees the script superimposed on the scene he is doing. In another application camera K may be photographing a scene or perhaps transmitting a movie film as represented by the ring. At the same time, a performer, such as a commentator or announcer, is commenting on the scene or film reading the script and simultaneously observing the scene in viewer M as shown by the X and the ring. The viewer is mounted upon another camera which is observing the viewer. The director can then switch back and forth from the commentator to the film or scene as may be required and at the same time the performer can continue the running commentary perfectly synchronized to the material being filmed or televised.

Figure 8:
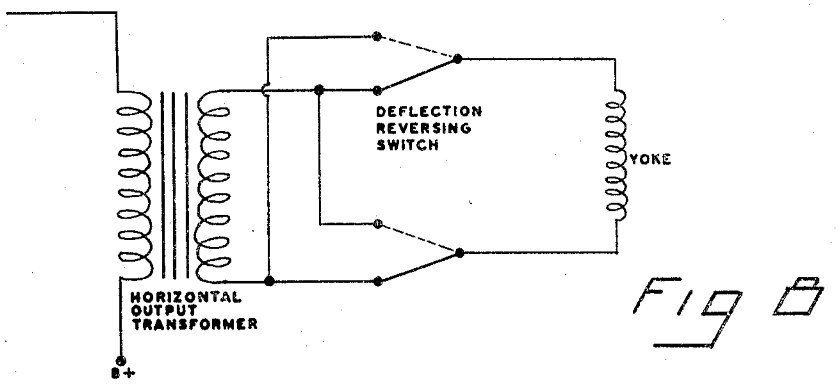
Figure 8 is a diagram of a deflection reversing circuit.

Because of the fact that the performer will see a mirror image of the material appearing on the screen of the picture tube of the viewer I of Figure 6, it is necessary to provide some means for reversing the image on the screen so that it will be reflected to the performer in a normal readable position. A simple means for accomplishing this is illustrated in Figure 8. In this diagram a portion of the video receiving circuit is shown with a reversing switch incorporated for the purpose of reversing the direction of the sweep which in turn will result in a horizontal reversal of the image on the screen of the tube, thus achieving the desired result. As shown in Figure 6, the receiving tube and mirror are enclosed in a housing which is preferably substantially light tight so as to provide a clear reflection.

This objective can be achieved in other ways. For example, instead of reversing the image electronically as above, a double mirror arrangement could be utilized in the manner described in my aforesaid copending applications. In cases where auxiliary units are not required, the material could be picked up by the television camera A in reverse by viewing the material from the reverse side of the film on which it appears. Translucent material may be used for receiving the script and light can be passed through the strip so that the television pickup can be in reverse and the material will appear on the screen of the viewing tube in reverse also thus permitting the reflecting mirror to transmit the image to the performer in the correct readable position.

Figure 9:
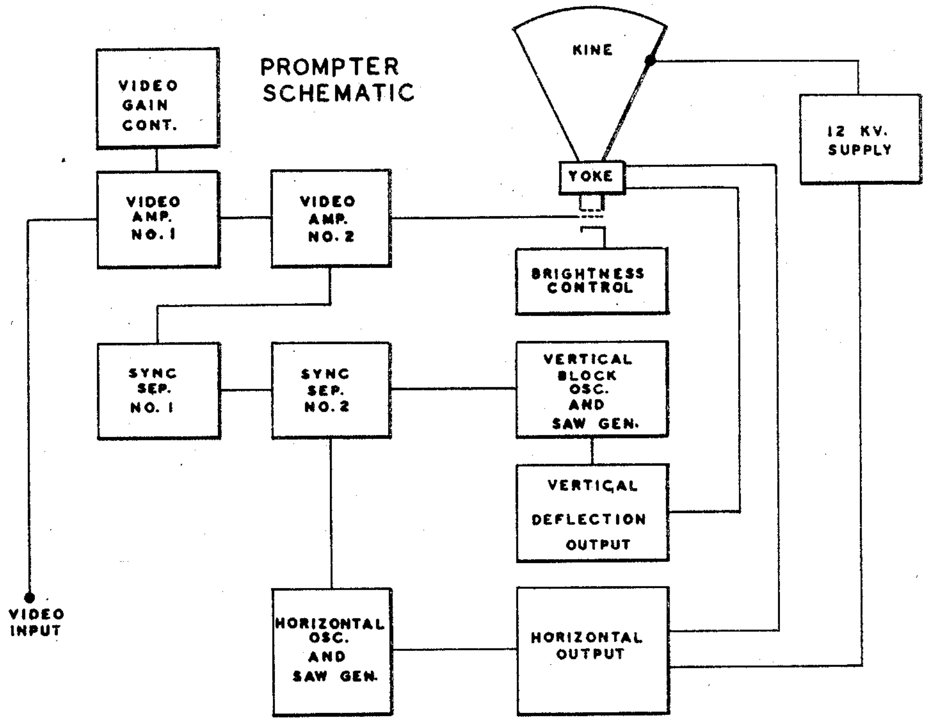
Figure 9 is a schematic layout of a typical video receiving system as utilized in the invention.

In Figure 9 is illustrated a schematic layout of a video receiving system as used in connection with the viewer which incorporates conventional components and is self-explanatory.

Various modifications may be made in the invention without departing from the spirit of the invention as exemplified by the following claims.

I claim:

1. A closed circuit television prompting system for cameras which comprises, a monitor and control station including a televising device and controls therefor, means for transporting information on an elongated strip of sheet material through the field of view of said device, a first television receiving device including a first picture tube electrically interconnected with said televising device adapted to reproduce said information upon the face of said first picture tube, said first receiving device being associated with said monitor and control station, and having controls therefor associated therewith a second television receiving device including a second picture tube reproducing said information from said televising device but remote therefrom, a camera having a lens system, a housing enclosing said lens system having front and rear openings and mounted in fixed position in association with said camera for movement with said camera with said openings in alignment with said lens system and with the rear opening adjacent to said lens system, an inclined transparent reflecting mirror positioned in said housing and interposed between said openings with its reflective surface directed toward the front opening of the housing, the face of said second picture tube being positioned on said housing and movable therewith and with said camera with its face at a reflective angle with respect to said transparent mirror, the position of said second picture tube face, said transparent mirror, and said housing with respect to said lens system being such that an image of the information transmitted to said first picture tube is simultaneously transmitted to the face of said second picture tube and to the transparent mirror and thence to a performer while said performer is looking toward the lens system of the camera and is being observed thereby.

2. A closed circuit television prompting system for cameras comprising a monitor unit having a television camera associated therewith, transport mechanism positioned in front of the lens of said camera, a sheet bearing script material thereon mounted on said transport mechanism, means for operating said transport mechanism for moving said sheet past said lens, means positioned in the line of sight of said lens for receiving a member bearing auxiliary information thereon, a plurality of independently actuated signals also positioned in the line of sight of said lens and adjacent to said sheet, said card and said signals being adapted to convey auxiliary information through said lens simultaneously with the pick up of the script material on the sheet, a television receiving circuit having a television picture tube associated with said monitor and interconnected with said television camera, another television receiving circuit having a second television picture tube remote from said monitor but in circuit with said television camera, a second camera remote from said monitor for viewing a performer having a lens system, a housing having front and rear openings mounted in fixed position for movement with said second camera and having its openings in alignment with said lens system and with its rear opening adjacent thereto an inclined transparent mirror positioned between said performer and said camera lens and interposed in the line of sight between said performer and said second camera lens, said second television tube being positioned on said housing at a reflecting angle to said inclined mirror whereby said script and auxiliary information picked up by the camera associated with the monitor are simultaneously projected onto the screens of both television tubes and is reflected by the second tube onto the surface of said inclined mirror to the performer.

3. A system according to claim 1 wherein a plurality of cameras is provided for viewing a performer at different angles and wherein each of said cameras is provided with a housing movable therewith enclosing the lens system thereof each such housing having front and rear openings, an inclined transparent mirror, and a picture tube mounted thereon and movable therewith and with the camera, and each thereby enabled to observe a performer at a different angle while an image of the information is transmitted to him.

4. A closed circuit television system for the transmission of prompting information to an individual appearing before a camera, which comprises television camera means, means for exposing information to the field of view of said viewing means, television transmitting and receiving means associated with said viewing means, a camera having a lens system for viewing an individual, an enclosure having front and rear openings positioned in front of and surrounding and enclosing said lens system and being mounted upon and affixed to said camera with its rear opening adjacent to said lens system, said housing being movable with said camera with said openings in alignment with said lens system, a television video receiving tube for reproducing an image of the information on its face associated with said receiving means, said tube being mounted within said enclosure and movable therewith and with the camera with its screen in a horizontal position, an inclined transparent mirror mounted within said enclosure and positioned between said openings in front of said lens system and in the path of view between said lens system and said individual, said mirror being positioned at a reflective angle with respect to the face of said video receiving tube whereby the image appearing thereon will be reflected by said mirror through said front opening to the eyes of the individual.

5. A system according to claim 1 wherein the information projected upon the transparent mirror is in reversed position.

6. A system according to claim 1 wherein the camera is interconnected with said second television receiving circuit whereby material observed by said camera may be superimposed upon the information appearing on the face of said second television receiving tube and reflected from said inclined transparent mirror for transmission to said performer.

7. A television prompting system for conveying script information and television production direction to a performer comprising selective means having controls to graphically present said information and directions, a first television camera positioned to form a television signal of said information and directions, said selective means and said first camera located in a production area; a television image reproducer connected to said first camera and said controls also located in a production area; a second television camera located in a performing area to televise the performance of said performer, an enclosure having openings attached to said second camera, a second television image reproducer also connected to said first camera, optically transparent reflective means within said enclosure optically related to said second camera and to said second image reproducer to combine the optical systems thereof at the eyes of said performer.

8. A television prompting system for conveying television production information to a plurality of performers comprising selective means to graphically present production information, said selective means remotely located with respect to the area occupied by said performers, a first television camera adjacent to said selective means to produce a television signal of said production information, television image reproduction means connected to said first television camera and located thereat to enable television production control, second television image reproduction means similarly connected and located adjacent to the area occupied by said performers for their reference thereto, a third television image reproduction means similarly connected and attached to a second television camera, said second television camera adapted to televise the performance of at least one of said performers, an enclosure having front and rear openings and inclined optically transparent reflective means bisecting the optical paths of said second television camera and said third television image reproduction means to provide production information to said one performer looking into said second television camera.

References Cited in the file of this patent

UNITED STATES PATENTS

| | | |
|---|---|---|
| 2,420,198 | Rosenthal | May 6, 1947 |
| 2,711,667 | Simjian | June 28, 1955 |
| 2,727,427 | Jenkins | Dec. 20, 1955 |